UNITED STATES PATENT OFFICE.

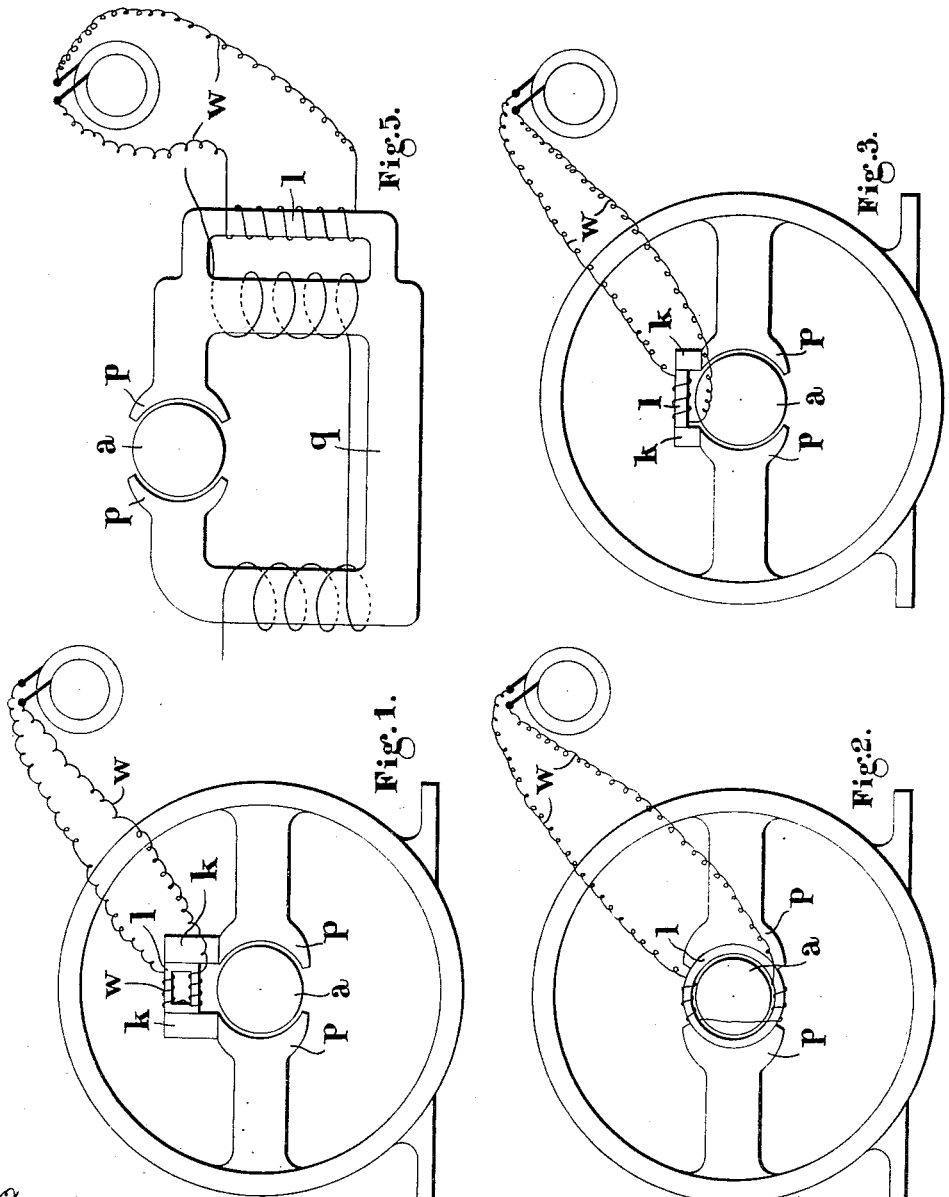

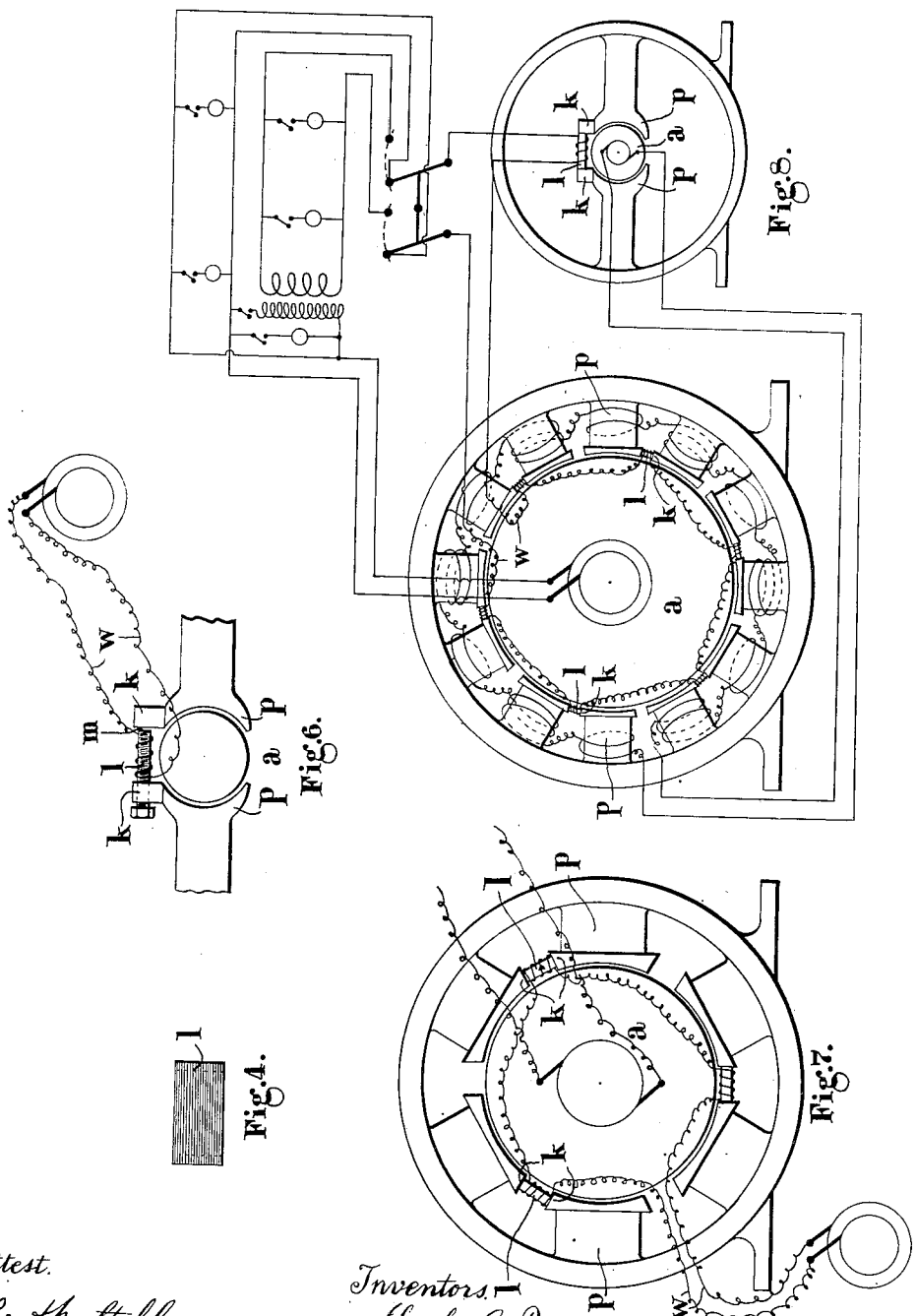

CHARLES ALGERNON PARSONS AND ALEXANDER HENRY LAW, OF NEWCASTLE-UPON-TYNE, ENGLAND; SAID LAW ASSIGNOR TO SAID PARSONS.

DYNAMO-ELECTRIC MACHINERY.

No. 925,499.  Specification of Letters Patent.  Patented June 22, 1909.

Application filed October 8, 1906. Serial No. 337,984.

*To all whom it may concern:*

Be it known that we, CHARLES ALGERNON PARSONS and ALEXANDER HENRY LAW, subjects of the King of Great Britain and Ireland, residing at Heaton Works, Newcastle-upon-Tyne, in the county of Northumberland, England, have invented certain new and useful Improvements in and Relating to Dynamo-Electric Machinery, of which the following is a specification.

Our invention relates to dynamo electric machines and particularly to the regulation of the same.

In dynamo electric machines (both continuous and alternating) it has been found that on account of armature reaction and ohmic loss the excitation has to be increased as the external load is increased. This is usually done by compound winding or by alteration of the field rheostat. Further it has been found that when iron forming part of a magnetic circuit is subjected to an alternating flux superimposed on a continuous flux, the permeability of the iron is diminished, that is the magnetic resistance is apparently increased.

The object of our invention is to provide means for the regulation of dynamo electric machinery utilizing the latter principle in a new manner.

Our invention consists in the use of a leakage path, which can be subjected to an alternating magneto motive force and which bridges the poles of the field magnets the amount of leakage being regulated at will by varying the current producing the alternating magneto motive force.

Our invention further consists in the various arrangements hereinafter described.

Referring to the accompanying drawings, Figure 1 is a diagrammatic view illustrating one modification of the invention, while Figs. 2 and 3 are similar views of other modifications. Fig. 4 is a plan of the laminated iron ring shown in Fig. 2; Fig. 5 shows a modification in which the leakage path is connected from one pole to the yoke of the field magnet; Fig. 6 shows a leakage path and adjustable air gap in the same; Fig. 7 shows the application of the invention to a multipolar machine. Fig. 8 shows a modified arrangement of the invention.

In the arrangement shown in Fig. 1, the pole pieces, $p$, $p$, are provided with projections, $k$, $k$, between which is situated the leakage path, $l$, carrying a winding, $w$, to which an alternating current is applied.

In the arrangement shown in Fig. 2, a continuous ring of laminated iron is provided concentric with the armature, the bore of the field magnets being enlarged to receive the ring, and the alternating current is passed through a winding carried by the ring.

In the modification illustrated in Fig. 3, the leakage path is in the form of one or more bars connecting projections from the pole pieces and wound in a similar manner.

The effect of passing an alternating current through the winding on the leakage path is to decrease the number of lines of force passing through the leakage path between the poles and therefore to increase the number of lines of force cut by the conductors of the armature and increase the E. M. F.

It will readily be seen therefore that the invention may be carried out in various ways other than those illustrated and any suitable arrangement of laminated iron may be used provided it constitutes a leakage path between the pole pieces, and the winding may be arranged to suit either single or polyphase currents as desired. It will be seen also that the leakage paths may or may not have an air gap $m$, Fig. 6, between them and the poles and this air gap may, if desired, be used for effecting an adjustment of the apparatus to meet different working conditions. The invention may also be applied to multipolar dynamos in a similar manner as shown in Fig. 7.

In an alternator also we may provide the exciter magnets or the main magnets or both with leakage paths as above described and pass around them either the main current or a portion of the same which may or may not be transformed as illustrated for example in Fig. 8. The effect of this is that as the load rises the magnetic resistance of the rings is increased, more lines of force are driven through the armature and thus even with a low power factor the voltage can be maintained or even increased automatically. We have found that where such a device is applied to the exciter magnets the inductive loss of voltage in the winding around the leakage path is very small while if applied to the main magnets the loss is considerable. Further the leakage path $l$ may be divided up into portions as shown in Fig. 1; also the leakage path $l$ may join the main magnetic circuit between the poles and the yoke $q$ as shown in Fig. 5, of the field magnet thus bridging a portion of the magnetic circuit upon which the main magneto motive force is impressed.

Having now described our invention, what we claim as new and desire to secure by Letters Patent is:—

1. In dynamo electric machines, means for regulating the voltage as the load increases, comprising in combination, field magnets, magnetic material in proximity to said field magnets, a winding on said magnetic material, and means supplying alternating current to said winding, as and for the purpose described.

2. In dynamo electric machines, means for regulating the voltage as the load increases, comprising in combination, field magnets, magnetic material disposed as a leakage path in relation to said field magnets, a winding on said magnetic material, and means supplying alternating current to said winding, as set forth.

3. In dynamo electric machines, means for regulating the voltage as the load increases, comprising in combination, field magnets, a closed figure of magnetic material disposed between said pole pieces, and a winding on said closed figure as set forth.

4. In dynamo electric machines, means for regulating the voltage as the load increases, comprising in combination, field magnets, projections on said field magnets, a closed figure of magnetic material disposed between said projections and a winding on said closed figure, as set forth.

5. In dynamo electric machines, means for regulating the voltage as the load increases, comprising in combination, field magnets, magnetic material bridging the poles of said field magnets, a winding on said magnetic material and means supplying alternating current to said winding, as set forth.

6. In dynamo electric machines, means for regulating the voltage as the load increases, comprising in combination field magnets, laminated iron disposed as a leakage path in relation to said magnets, a winding disposed on said iron, and means supplying alternating current to said winding, as set forth.

7. In alternators a field magnet, magnetic material disposed as a leakage path in relation to said magnet, a winding on said magnetic material, and means supplying alternating current to said winding, as set forth.

In testimony whereof, we affix our signatures in presence of two witnesses.

CHARLES ALGERNON PARSONS.
ALEXANDER HENRY LAW.

Witnesses:
HENRY GRAHAM DAKYNS, Jr.,
FREDERICK GORDON HAY BEDFORD.